United States Patent
Falkner

(10) Patent No.: US 7,111,055 B2
(45) Date of Patent: Sep. 19, 2006

(54) METHOD AND APPARATUS TO FACILITATE AUTOMATED SOFTWARE INSTALLATION ON REMOTE COMPUTERS OVER A NETWORK

(75) Inventor: James H. Falkner, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 834 days.

(21) Appl. No.: 09/944,307

(22) Filed: Aug. 30, 2001

(65) Prior Publication Data

US 2003/0046371 A1 Mar. 6, 2003

(51) Int. Cl.
*G06F 15/177* (2006.01)
(52) U.S. Cl. ............... 709/221; 709/222; 717/178; 717/171; 717/173; 717/174
(58) Field of Classification Search ........ 709/220–224, 709/217–219, 203, 201, 225; 717/176, 170–173, 717/169, 177, 174, 178; 707/1, 10; 715/736, 715/740, 760, 968, 969
See application file for complete search history.

(56) References Cited

U.S. PATENT DOCUMENTS

| | | | |
|---|---|---|---|
| 5,421,009 A * | 5/1995 | Platt ........................... | 709/221 |
| 5,978,590 A | 11/1999 | Imai et al. .................. | 395/712 |
| 6,049,671 A * | 4/2000 | Slivka et al. ................ | 717/173 |
| 6,167,567 A * | 12/2000 | Chiles et al. ................ | 717/173 |
| 6,289,512 B1 * | 9/2001 | Edwards et al. ............. | 717/178 |
| 6,675,382 B1 * | 1/2004 | Foster .......................... | 717/177 |
| 6,725,453 B1 * | 4/2004 | Lucas et al. ................. | 717/178 |
| 6,754,896 B1 * | 6/2004 | Mishra et al. .............. | 717/176 |
| 6,865,737 B1 * | 3/2005 | Lucas et al. ................. | 717/178 |

FOREIGN PATENT DOCUMENTS

EP 0 592 079 A2 4/1994 ................. 9/445

OTHER PUBLICATIONS

Publication entitled "Remote Operating System Installation Overview", Microsoft Windows 2000 Worldwide, Posted Oct. 28, 1999, XP-002258896, wysiwyg://25/http://web.archive....tworks/management/remote.

* cited by examiner

*Primary Examiner*—Jeffrey Pwu
(74) *Attorney, Agent, or Firm*—Park, Vaughan & Fleming, LLP; Edward J. Grundler

(57) ABSTRACT

One embodiment of the present invention provides a system that facilitates automated software installation on a remote computer over the Internet. The system operates by first initializing the remote computer with a custom operating system, which allows access to the remote computer over the Internet. Next, the system provides an archive locator to the remote computer, wherein the archive locator is a uniform resource locator (URL) or a proprietary resource locator. The system then requests an archive from the site specified by the archive locator. This archive includes an operating system and desired software packages pre-configured for the remote computer. The system downloads this archive to the remote computer and re-initializes the remote computer with the operating system and software packages in the archive.

18 Claims, 2 Drawing Sheets

METHOD AND APPARATUS TO FACILITATE AUTOMATED SOFTWARE INSTALLATION ON REMOTE COMPUTERS OVER A NETWORK

BACKGROUND

1. Field of the Invention

The present invention relates to configuring computer systems. More specifically, the present invention relates to a method and an apparatus to facilitate automated software installation on remote computers over a network.

2. Related Art

Many modern businesses maintain an electronic presence on the Internet to facilitate interacting with customers and prospects. In many cases, this presence is established using a computer or multiple computers at a site remote from the business. Although these computers can be accessed by the business over the Internet, they are often unavailable for direct physical access. This unavailability may be because the remote site is far removed from the location of the business, or possibly because the computers are leased from another business, which owns and maintains the computers at the remote site and limits access by the lessee.

Typically, an administrator configures and controls these remote computers using a private network 106, separate from the Internet. FIG. 1 illustrates access by administrator 102 to configure remote computers in accordance with the prior art. Administrator 102 uses computer 104 to configure remote computers 112, 114, 116, 118, 120, and 122, located at remote site 110, across private network 106. Note that there may be more or less remote computers than the number shown. In some installations, the number of these remote computers is in the hundreds.

Customers 124 typically access remote computers 112, 114, 116, 118, 120, and 122 across public network 108. Administrator 102 can also access remote computers 112, 114, 116, 118, 120, and 122 across public network 108.

Computer 104 and remote computers 112, 114, 116, 118, 120, and 122 can generally include any type of computer system, including, but not limited to, a computer system based on a microprocessor, a mainframe computer, a digital signal processor, a portable computing device, a personal organizer, a device controller, and a computational engine within an appliance. Typically, computer 104 includes a web browser (not shown) to facilitate access to remote computers 112, 114, 116, 118, 120, and 122 by administrator 102.

Private network 106 and public network 108 can generally include any type of wire or wireless communication channel capable of coupling together computing nodes. This includes, but is not limited to, a local area network, a wide area network, or a combination of networks. In one embodiment of the present invention, public network 108 includes the Internet.

During configuration of a remote computer, say remote computer 118, administrator 102 accesses remote computer 118 across private network 106. Typically, administrator 102 mounts a network file system (NFS) (not shown) on private network 106 to provide the necessary files to configure remote computer 118. Administrator 102 then loads and configures the individual programs, one at a time, from the NFS. This process of mounting the NFS and configuring the individual programs is then repeated for each remote computer to complete the installation. Once remote computers 112, 114, 116, 118, 120, and 122 have been configured, customers 124 can access the remote computers to conduct business.

This is a labor-intensive and time-consuming process because each remote computer—out of possibly hundreds of remote computers—is configured individually, even though the configuration remains the same from remote computer to remote computer. This process also requires the additional expense of maintaining private network 106 between computer 104 and the remote computers at remote site 110.

What is needed is a method and an apparatus, which allows configuration of multiple remote computers without the disadvantages stated above.

SUMMARY

One embodiment of the present invention provides a system that facilitates automated software installation on a remote computer over the Internet. The system operates by first initializing the remote computer with a custom operating system, which allows access to the remote computer over the Internet. Next, the system provides an archive locator to the remote computer, wherein the archive locator is a uniform resource locator (URL) or a proprietary resource locator. The system then requests an archive from the site specified by the archive locator. This archive includes an operating system and desired software packages pre-configured for the remote computer. The system downloads this archive to the remote computer and re-initializes the remote computer with the operating system and software packages in the archive.

In one embodiment of the present invention, the system loads the custom operating system into the remote computer during installation of the remote computer.

In one embodiment of the present invention, the system initializes the remote computer automatically with the custom operating system when power is applied to the remote computer.

In one embodiment of the present invention, the system creates the archive and stores the archive at a site on the Internet accessible using the archive locator. Upon receiving an authorized request for the archive from the remote computer, the system downloads the archive to the remote computer.

In one embodiment of the present invention, the system creates the archive by first specifying the operating system and software packages to be included. Next, the system installs the operating system and software packages on a configuration computer compatible with the remote computer. The system then tests the operating system and software packages on the configuration computer. After testing the operating system and software packages, the system creates a snapshot of the operating system and software packages. A configuration file is included within the snapshot. The snapshot is saved as an archive at the site specified by the archive locator for download by the remote computer.

In one embodiment of the present invention, the configuration file includes data for configuring the operating system, network parameters, and software packages.

In one embodiment of the present invention, providing the archive locator includes providing the archive locator over the Internet.

In one embodiment of the present invention, providing the archive locator includes providing the archive locator in a command line parameter during initialization of the remote computer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Coupling

Figure 1:
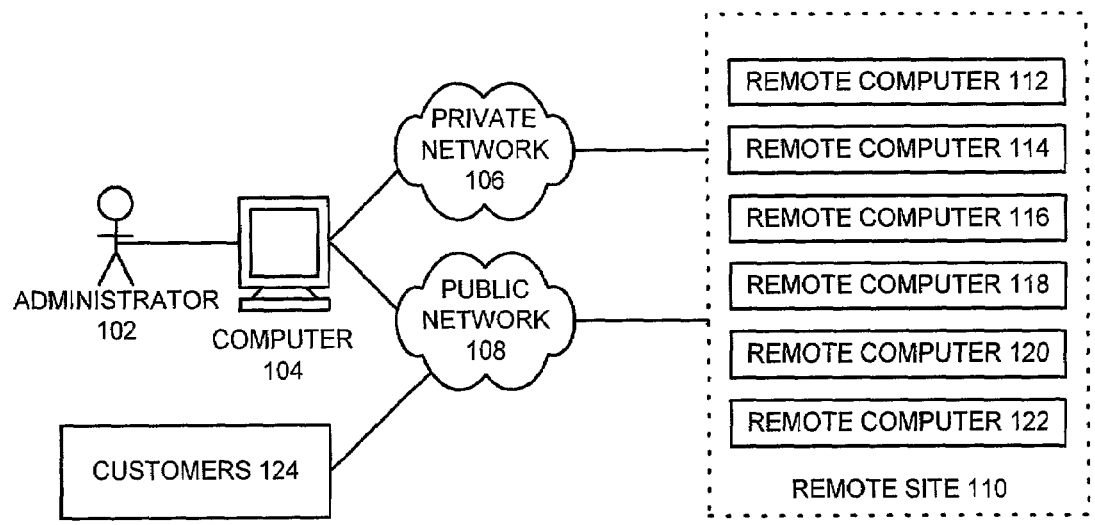
FIG. 1 illustrates access by administrator 102 to configure remote computers in accordance with the prior art.
Figure 2:
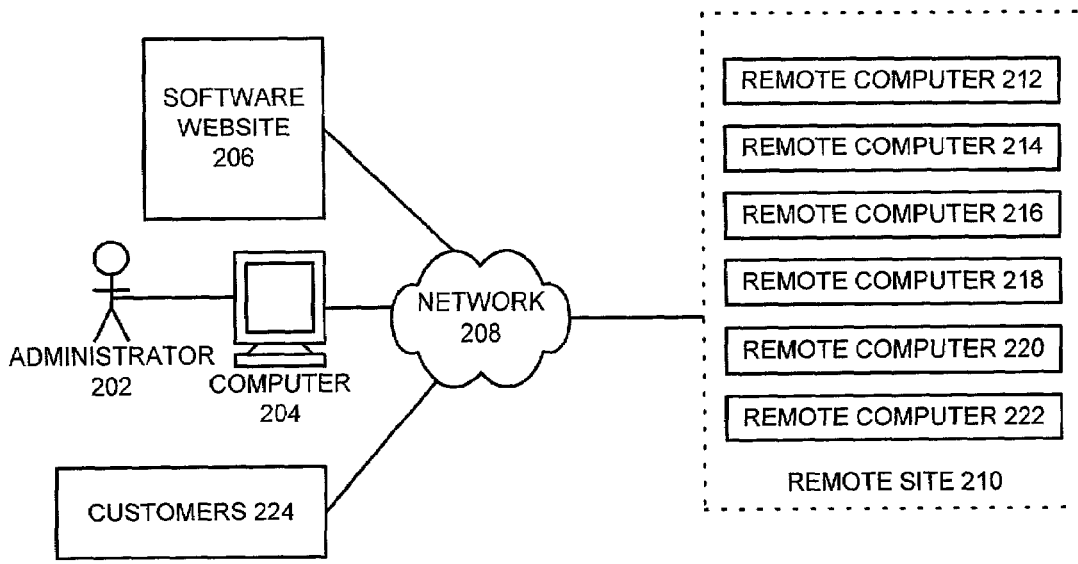
FIG. 2 illustrates access by administrator 202 to configure remote computers in accordance with an embodiment of the present invention.

FIG. 2 illustrates access by administrator 202 to configure remote computers in accordance with an embodiment of the present invention. Administrator 202 uses computer 204 to configure remote computers 212, 214, 216, 218, 220, and 222, located at remote site 210. Note that there may be more or less remote computers than the number shown. In some installations, the number of these remote computers is in the hundreds. Administrator 202 can access remote computers 212, 214, 216, 218, 220, and 222 across network 208. Customers 224 typically access remote computers 212, 214, 216, 218, 220, and 222 across network 208. Remote computers 212, 214, 216, 218, 220, and 222 can access software website 206 across network 208.

Computer 204, remote computers 212, 214, 216, 218, 220, and 222 and software website 206 can generally include any type of computer system, including, but not limited to, a computer system based on a microprocessor, a mainframe computer, a digital signal processor, a portable computing device, a personal organizer, a device controller, and a computational engine within an appliance. Typically, computer 204 includes a web browser (not shown) to facilitate access to remote computers 212, 214, 216, 218, 220, and 222 by administrator 202. Software website 206 includes a mechanism so that remote computers at remote site 210 can pull software loads from software website 206.

Network 208 can generally include any type of wire or wireless communication channel capable of coupling together computing nodes. This includes, but is not limited to, a local area network, a wide area network, or a combination of networks. In one embodiment of the present invention, network 208 includes the Internet.

During initial startup of a remote computer at remote site 210, say remote computer 218, the system first loads a custom operating system. In this context, a custom operating system is an operating system that includes the minimal functionality required to perform the required functions. This custom operating system includes sufficient functionality to determine the location of an archive, download the archive, install the archived software, and restart remote computer 218, so that remote computer 218 can execute the software in the archive. The custom operating system may be stored in read only memory of the remote computer by the computer manufacturer, on a tape, on a compact disc, on a floppy disk, or the like. The custom operating system can be provided by administrator 202, by the provider of the remote computers, or by the provider of the software archive. The custom operating system distribution medium may remain at the remote site 210 for loading a new archive from software website 206 at a later time. This custom operating system can access the web to present information to and receive information from administrator 202 using a web browser on computer 204. Remote computer 218 can also download preinstalled software from a software website, such as software website 206, using any available protocol such as file transfer protocol (FTP). After downloading preinstalled software from software website 206, remote computer 218 re-initializes—or reboots—using the preinstalled software.

The preinstalled software from software website 206 is selected by administrator 202 based upon the operating system, target computer type, and specific programs included in the preinstalled software. Software website 206 may be owned by the company using the remote computers or by a third party business providing preinstalled software packages to other businesses. Administrator 202 provides the archive locator for software website 206 either as a command-line parameter during startup of the custom operating system, or interactively across network 208 using computer 204. An archive locator, as used herein, includes any network address.

Creating an Archive

Figure 3:
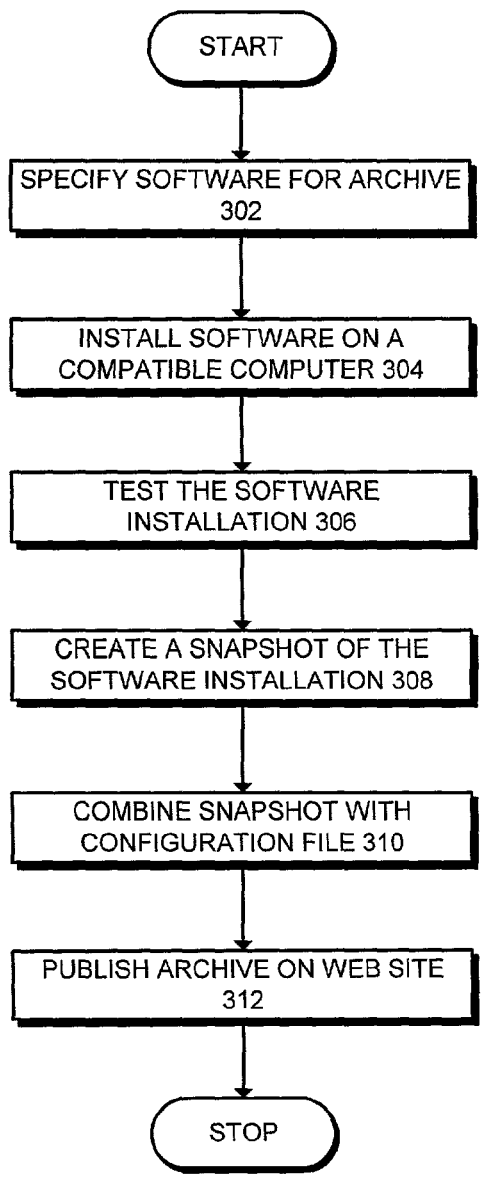
FIG. 3 is a flowchart illustrating the process of creating an archive in accordance with an embodiment of the present invention.

FIG. 3 is a flowchart illustrating the process of creating an archive in accordance with an embodiment of the present invention. The system starts when software is specified for the preinstalled software load (step 302). The selected software includes an operating system configured for a target computer type, and specific software programs to provide functions such as those typically available on a web server. These software programs can include a web server, a database server, an FTP server, and the like. Note that this process can be performed by the company using the remote computers or by a third party business providing preinstalled software packages to other businesses.

Next, the software is installed on a computer that is compatible with remote computer 218 (step 304). These installations are performed using the techniques provided with the software packages. Note that some of these software packages may be precompiled, and some may require compilation and linking prior to installation on the compatible computer. After the software packages, including the operating system, have been loaded onto the compatible computer, the software installation is tested to ensure proper operation of the software packages and operating system (step 306). This testing can include simulating peak loads, exercising error handling capabilities, analyzing transaction data, and the like.

Upon passing these tests, a snapshot is made of the software and operating system (step 308). The snapshot includes disk and memory images of the operating system, executables, and data files, which will allow transfer of the software package to the compatible remote computer and to allow the software package to run on the compatible remote computer after transfer. Next, the snapshot is combined with a configuration file, which is used to set the various selections and parameters required by the software packages (step 310). These parameters include file system pointers, Internet protocol (IP) addresses, and system configuration parameters such as number of hard drives available on the remote computer. Finally, this preinstalled software package is published as an archive on software website 206 (step 312). Note that this archive may be compressed using any available compression software for efficient use of network bandwidth. Using this preinstalled software to configure the remote computers is advantageous, because the preinstalled software does not require administrator 202 to individually configure the software on each remote computer.

Downloading Preinstalled Software

Figure 4:
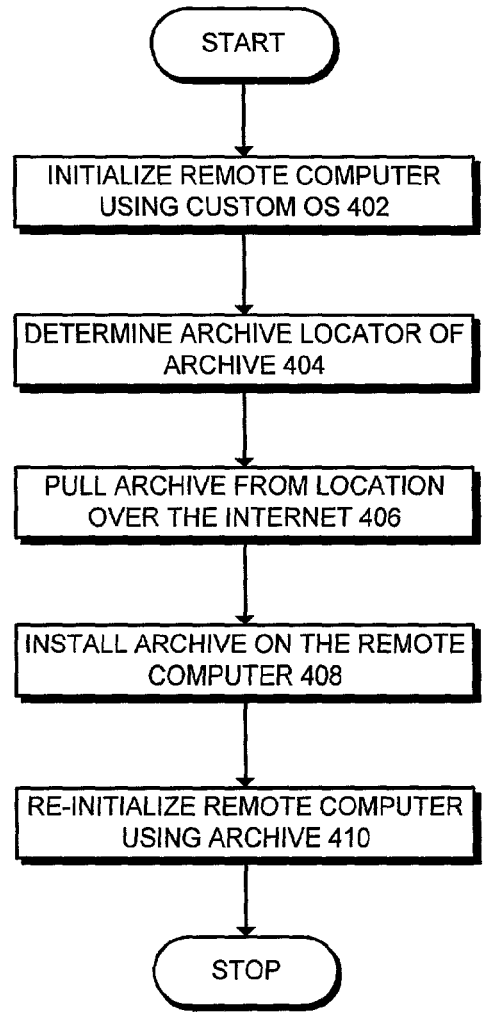
FIG. 4 is a flowchart illustrating the process of installing an archive in accordance with an embodiment of the present invention.

FIG. 4 is a flowchart illustrating the process of installing an archive in accordance with an embodiment of the present invention. The system starts when a remote computer, say remote computer 218, is initialized—or booted—using a custom operating system (step 402). Next, the custom operating system determines the archive locator for software website 206 (step 404). Administrator 202 provides this archive locator either as a command-line parameter during boot-up, or interactively across network 208 using computer 204.

After determining the archive locator, remote computer 218 downloads the preinstalled software package archive from software website 206 over network 208 using hypertext transfer protocol (HTTP), file transfer protocol (FTP), or the like (step 406). Note that this archive may be compressed for efficient use of network bandwidth. Upon completion of the download, remote computer 218 decompresses the archive if it is compressed and installs the archive so that it will become active the next time remote computer 218 is initialized (step 408). Finally, remote computer 218 is reinitialized using the operating system and software packages within the archive. The operating system and software packages are configured using the parameters included in the archive. The configured system then allows access to remote computer 218 by customers 224 (step 410).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate automated software installation on a remote computer over the Internet, comprising:
    creating an archive, wherein creating the archive involves:
        specifying an operating system and software packages to be included,
        installing the operating system and software packages on a configuration computer compatible with the remote computer,
        testing the operating system and software packages on the configuration computer,
        creating a snapshot of the operating system and software packages,
        including a configuration file within the snapshot, and
        saving the snapshot at a site on the Internet specified by an archive locator for download by the remote computer, wherein the snapshot including the configuration file is the archive;
    storing the archive at the site on the Internet accessible using the archive locator;
    initializing the remote computer with the custom operating system, wherein the custom operating system allows access to the remote computer over the Internet, wherein the custom operating system determines the location of the archive, downloads the archive, installs the archived software and restarts the remote computer;
    providing the archive locator to the remote computer, wherein the archive locator is one of, a uniform resource locator (URL) and a proprietary resource locator;
    requesting the archive from a site specified by the archive locator, wherein the archive includes the operating system and desired software packages pre-configured for the remote computer;
    upon receiving an authorized request for the archive from the remote computer, downloading the archive to the remote computer from the site specified by the archive locator; and
    re-initializing the remote computer with the operating system and software packages in the archive.

2. The method of claim 1, further comprising loading the custom operating system into the remote computer during installation of the remote computer.

3. The method of claim 1, further comprising initializing the remote computer automatically with the custom operating system when power is applied to the remote computer.

4. The method of claim 1, wherein the configuration file includes data for configuring the operating system, network parameters, and software packages.

5. The method of claim 1, wherein providing the archive locator includes providing the archive locator over the Internet.

6. The method of claim 1, wherein providing the archive locator includes providing the archive locator in a command line parameter during initialization of the remote computer.

7. A computer-readable storage medium storing instructions that when executed by a computer cause the computer to perform a method to facilitate automated software installation on a remote computer over the Internet, the method comprising:
    creating an archive, wherein creating the archive involves:
        specifying an operating system and software packages to be included,
        installing the operating system and software packages on a configuration computer compatible with the remote computer,
        testing the operating system and software packages on the configuration computer,
        creating a snapshot of the operating system and software packages, including a configuration file within the snapshot, and
saving the snapshot at a site on the Internet specified by
an archive locator for download by the remote computer. wherein the snapshot including the configuration file is the archive;

storing the archive at the site on the Internet accessible using the archive locator;

initializing the remote computer with the custom operating system, wherein the custom operating system allows access to the remote computer over the Internet, wherein the custom operating system determines the location of the archive, downloads the archive, installs the archived software and restarts the remote computer;

providing the archive locator to the remote computer, wherein the archive locator is one of, a uniform resource locator (URL) and a proprietary resource locator;

requesting the archive from a site specified by the archive locator, wherein the archive includes the operating system and desired software packages pre-configured for the remote computer;

upon receiving an authorized request for the archive from the remote computer, downloading the archive to the remote computer from the site specified by the archive locator; and re-initializing the remote computer with the operating system and software packages in the archive.

8. The computer-readable storage medium of claim 7, the method further comprising loading the custom operating system into the remote computer during installation of the remote computer.

9. The computer-readable storage medium of claim 7, the method further comprising initializing the remote computer automatically with the custom operating system when power is applied to the remote computer.

10. The computer-readable storage medium of claim 7, wherein the configuration file includes data for configuring the operating system, network parameters, and software packages.

11. The computer-readable storage medium of claim 7, wherein providing the archive locator includes providing the archive locator over the Internet.

12. The computer-readable storage medium of claim 7, wherein providing the archive locator includes providing the archive locator in a command line parameter during initialization of the remote computer.

13. An apparatus that facilitates automated software installation on a remote computer over the Internet, comprising:

a creating mechanism that is configured to create an archive;

a storing mechanism that is configured to store the archive at a site on the Internet accessible using an archive locator;

a specifing mechanism that is configured to specify an operating system and software packages to be included;

an installing mechanism that is configured to install the operating system and software packages on a configuration computer compatible with the remote computer;

a testing mechanism that is configured to test the operating system and software packages on the configuration computer;

wherein the creating mechanism is further configured to create a snapshot of the operating system and software packages;

an including mechanism that is configured to include a configuration file within the snapshot; and a saving mechanism that is configured to save the snapshot at the site specified by the archive locator for download by the remote computer, wherein the snapshot including the configuration file is the archive an initializing mechanism that is configured to initialize the remote computer with the custom operating system, wherein the custom operating system allows access to the remote computer over the Internet, and wherein the custom operating system determines the location of the archive, downloads the archive, installs the archived software and restarts the remote computer;

a providing mechanism that is configured to provide the archive locator to the remote computer, wherein the archive locator is one of a uniform resource locator (URL) and a proprietary resource locator;

a requesting mechanism that is configured to request the archive from the site specified by the archive locator, wherein the archive includes an operating system and desired software packages pre-configured for the remote computer;

a downloading mechanism that is configured to download the archive to the remote computer from the site specified by the archive locator, wherein the downloading mechanism is further configured to download the archive to the remote computer; and a re-initializing mechanism that is configured to re-initialize the remote computer with the operating system and software packages in the archive.

14. The apparatus of claim 13, further comprising a loading mechanism that is configured to load the custom operating system into the remote computer during installation of the remote computer.

15. The apparatus of claim 13, wherein the initializing mechanism is further configured to initialize the remote computer automatically with the custom operating system when power is applied to the remote computer.

16. The apparatus of claim 13, wherein the configuration file includes data for configuring the operating system, network parameters, and software packages.

17. The apparatus of claim 13, wherein providing the archive locator includes providing the archive locator over the Internet.

18. The apparatus of claim 13, wherein providing the archive locator includes providing the archive locator in a command line parameter during initialization of the remote computer.

* * * * *